(12) United States Patent
Kurozumi

(10) Patent No.: US 11,067,858 B2
(45) Date of Patent: Jul. 20, 2021

(54) LIQUID CRYSTAL DISPLAY DEVICE

(71) Applicant: SHARP KABUSHIKI KAISHA, Sakai (JP)

(72) Inventor: Yukio Kurozumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/854,371

(22) Filed: Apr. 21, 2020

(65) Prior Publication Data

US 2020/0341318 A1 Oct. 29, 2020

(30) Foreign Application Priority Data

Apr. 23, 2019 (JP) .............................. JP2019-081899

(51) Int. Cl.
*G02F 1/1339* (2006.01)
*G02F 1/1362* (2006.01)
*G02F 1/1337* (2006.01)

(52) U.S. Cl.
CPC ...... *G02F 1/13394* (2013.01); *G02F 1/13396* (2021.01); *G02F 1/13398* (2021.01); *G02F 1/136286* (2013.01); *G02F 1/1337* (2013.01)

(58) Field of Classification Search
CPC ............. G02F 1/13394; G02F 1/13396; G02F 1/13398; G02F 1/136286
See application file for complete search history.

(56) References Cited

U.S. PATENT DOCUMENTS

| | | | |
|---|---|---|---|
| 7,468,776 B2 * | 12/2008 | Tawaraya | G02F 1/13394 349/155 |
| 2005/0140914 A1 | 6/2005 | Sawasaki et al. | |
| 2008/0182351 A1 | 7/2008 | Sawasaki et al. | |

FOREIGN PATENT DOCUMENTS

| JP | 2005-189662 A | 7/2005 |
|---|---|---|
| JP | 6022850 B2 | 11/2016 |

* cited by examiner

*Primary Examiner* — Dung T Nguyen
(74) *Attorney, Agent, or Firm* — ScienBiziP, P.C.

(57) ABSTRACT

A liquid crystal display device includes a first substrate, a second substrate, and a liquid crystal layer. The first substrate includes a plurality of first spacers protruding toward the liquid crystal layer, and the second substrate includes, on a surface closer to the liquid crystal layer, an alignment film, a plurality of second spacers in contact with the plurality of first spacers, and a plurality of pedestal films facing the plurality of first spacers. A height of the plurality of second spacers is greater than a height of the plurality of pedestal films, and the plurality of pedestal films include a first pedestal film having a smaller area than an area of each of the plurality of second spacers, and a second pedestal film having a planar pattern that is longer, as a whole, than a planar pattern of the first pedestal film.

4 Claims, 9 Drawing Sheets

LIQUID CRYSTAL DISPLAY DEVICE

CROSS-REFERENCE TO RELATED APPLICATIONS

This application claims the benefit of priority to Japanese Patent Application Number 2019-081899 filed on Apr. 23, 2019. The entire contents of the above-identified application are hereby incorporated by reference.

BACKGROUND

Technical Field

The disclosure relates to a liquid crystal display device.

A liquid crystal display device is a display device in which a liquid crystal composition is used for display. In a typical display system for the liquid crystal display device, a liquid crystal panel including the liquid crystal composition enclosed between a pair of substrates is irradiated with light from a backlight, and a voltage is applied to the liquid crystal composition to change an alignment of liquid crystal molecules, thereby controlling an amount of light passing through the liquid crystal panel. Such a liquid crystal display device has features such as a thin profile, light weight, and low power consumption, and is thus utilized in electronic devices such as televisions, smartphones, tablet terminals, and automotive navigation systems.

The liquid crystal panel has a configuration in which a liquid crystal layer is sealed between a pair of substrates, and the distance (a cell thickness) between the pair of substrates is determined by spacers. As the spacers, not only main spacers for controlling the cell thickness, but also sub-spacers that are lower than the main spacers may be provided, in order to secure a strength required when pressure is applied to the liquid crystal panel. Further, a pedestal portion may be arranged on the substrate facing the spacers, as a measure for securing the strength. For example, in JP 2005-189662 A, a configuration of a liquid crystal display device is disclosed that includes structures (main spacers and sub-spacers) having different heights and formed on a counter substrate (a color filter substrate) and a structure (a pedestal portion) supporting spacers formed on a TFT substrate (see Example 4 and FIGS. 3, 19, and 20). Further, in JP 6022850 B, a configuration is disclosed in which substrates are adhered together by arranging long and narrow spacers, which are formed on the different substrates, to be orthogonal to each other.

SUMMARY

When a known liquid crystal panel is pressed by a finger or the like, knocked against something, pressed from a surface by something with a strong load, or the like and caused to be deflected, for example, there are cases in which the tip of a spacer rubs and damages an alignment film formed on a substrate surface facing the spacer. Since light leakage occurs during black display in a display area of a location at which the alignment film is damaged, a bright spot is observed in a black screen. Thus, there is a demand for a measure to prevent the damage to the alignment film caused by the spacer coming into contact with the alignment film.

In the liquid crystal display devices disclosed in JP 2005-189662 A and JP 6022850 B, an arrangement of the spacers themselves is deliberately designed to prevent the damage to the alignment film. However, in addition to the retention of the cell thickness, the spacers have various roles, such as the suppression of air bubbles generated from including too little liquid crystal material and the suppression of gravitational unevenness generated from including too much liquid crystal material. Thus, with respect to the spacers, there are many restrictions on the conditions, such as an arrangement density, a size and the like. In particular, in recent years, there is a demand for a liquid crystal panel provided with smaller spacers to be arranged in a light blocking region, as the light blocking region is becoming narrower to achieve a high aperture ratio. Thus, there is a need for another method for preventing the damage to the alignment film caused by the spacer coming into contact with the alignment film.

In light of the foregoing, an object of the disclosure is to provide a liquid crystal display device capable of suppressing occurrence of a display failure caused by damage to an alignment film while securing a high aperture ratio.

(1) An embodiment of the disclosure is a liquid crystal display device including a first substrate, a second substrate, and a liquid crystal layer held between the first substrate and the second substrate. The first substrate includes a plurality of first spacers protruding toward the liquid crystal layer, and the second substrate includes, on a surface closer to the liquid crystal layer, an alignment film, a plurality of second spacers in contact with the plurality of first spacers, and a plurality of pedestal films facing the plurality of first spacers. A height of the plurality of second spacers is greater than a height of the plurality of pedestal films, and the plurality of pedestal films includes a first pedestal film having a smaller area than an area of each of the plurality of second spacers, and a second pedestal film having a planar pattern that is longer than the planar pattern of the first pedestal film.

(2) Additionally, in the liquid crystal display device in an embodiment of the disclosure, in addition to the configuration described in (1) above, an arrangement density of the plurality of pedestal films is greater than an arrangement density of the plurality of second spacers.

(3) In addition to the configuration of (1) or (2) above, in the liquid crystal display device in an embodiment of the disclosure, the first substrate is an active matrix substrate including a plurality of signal lines arranged to intersect each other in a substrate plane, and the plurality of pedestal films are arranged in a region overlapping a portion where the plurality of signal lines intersect.

(4) In addition to the configuration described in (3), in the liquid crystal display device in an embodiment of the disclosure, the second pedestal film has a cross shape along the portion where the plurality of signal lines intersect.

(5) Another embodiment of the disclosure is a liquid crystal display device including a first substrate, a second substrate, and a liquid crystal layer held between the first substrate and the second substrate. The first substrate includes a plurality of first spacers protruding toward the liquid crystal layer, and a first pedestal film. The second substrate includes, on a surface closer to the liquid crystal layer, an alignment film, a plurality of second spacers in contact with the plurality of first spacers. and a second pedestal film. The first pedestal film is lower and smaller in area than each of the plurality of first spacers and faces the plurality of second spacers, and the second pedestal film is lower than each of the plurality of second spacers, faces the plurality of first spacers, and has a planar pattern that is longer, as a whole, than a planar pattern of the first pedestal film.

According to the disclosure, it is possible to provide a liquid crystal display device capable of suppressing occurrence of a display failure caused by damage to an alignment film while securing a high aperture ratio.

BRIEF DESCRIPTION OF DRAWINGS

The disclosure will be described with reference to the accompanying drawings, wherein like numbers reference like elements.

DESCRIPTION OF EMBODIMENTS

Figure 1:
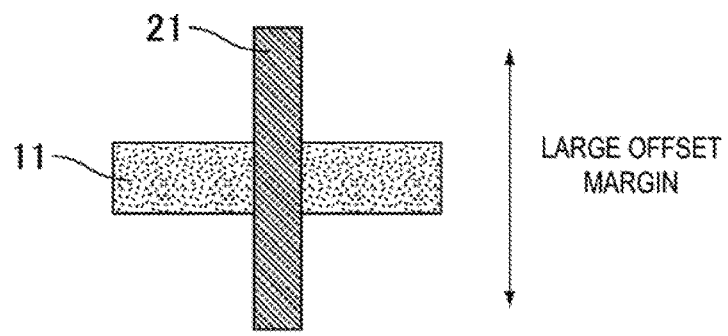
FIG. 1 is a schematic plan view illustrating an example of a configuration of a main spacer provided in a liquid crystal display device according to a first embodiment.

A liquid crystal display device according to embodiments of the disclosure will be described below. The disclosure is not limited to the contents described in the following embodiments, and appropriate design changes can be made within a scope that satisfies the configuration of the disclosure.

First Embodiment

A liquid crystal display device according to a first embodiment is provided with a first substrate, a second substrate, and a liquid crystal layer held between the first substrate and the second substrate. The first substrate includes a plurality of first spacers protruding toward the liquid crystal layer, and the second substrate includes, on a surface closer to the liquid crystal layer, an alignment film, a plurality of second spacers in contact with the plurality of first spacers, and a plurality of pedestal films facing the plurality of first spacers. A height of the plurality of second spacers is greater than a height of the plurality of pedestal films, and the plurality of pedestal films include a first pedestal film having a smaller area than an area of each of the plurality of second spacers, and a second pedestal film having a planar pattern that is longer, as a whole, than a planar pattern of the first pedestal film.

The first substrate and the second substrate are not particularly limited as long as the first substrate and the second substrate are a pair of substrates that sandwich the liquid crystal layer therebetween. For example, the first substrate that is a TFT substrate may be combined with the second substrate that is a color filter substrate, or the first substrate that is a color filter substrate may be combined with the second substrate that is a TFT substrate.

The distance (a cell thickness) between the pair of substrates is defined by the plurality of first spacers provided on the first substrate in contact with the plurality of second spacers provided on the second substrate. Thus, in a normal state, in which no pressure is applied to the liquid crystal panel, a top portion of the first spacer and a top portion of the second spacer are in contact with each other. In the present specification, a combination of the first spacer and the second spacer is also referred to as a "main spacer."

The first spacer that does not come into contact with the second spacer is provided to secure strength required when pressure is applied to the liquid crystal panel, and in the normal state in which no pressure is applied to the liquid crystal panel, the first spacer does not come into contact with the pedestal film provided on the second substrate, but in a state in which pressure is applied to the liquid crystal panel, the first spacer comes into contact with the pedestal film and prevents an excessive deformation of the liquid crystal panel. In the present specification, a combination of the spacer and the pedestal film, which do not come into contact with each other in the normal state in which no pressure is applied to the liquid crystal panel but which come into contact with each other in the state in which the pressure is applied to the liquid crystal panel, is also referred to as a "sub-spacer."

The first spacer configuring the main spacer and the first spacer configuring the sub-spacer may have the same shape and size, or may have different shapes and sizes, but preferably have the same shape and size.

The main spacer and the sub-spacer are preferably provided in a light blocking region. For example, the main spacer and the sub-spacer preferably overlap with a signal line provided on the first substrate or the second substrate, or a black matrix provided on the first substrate or the second substrate.

The main spacer and the sub-spacer are preferably cured products (photo spacers) formed of a photosensitive resin. When the main spacer and the sub-spacer are formed of the photosensitive resin, shapes of the main spacer and the sub-spacer can be patterned by photolithography.

In the present specification, "the height of the second spacer is greater than the height of the pedestal film" means that the top portion of the second spacer is located closer to the first substrate (closer to the liquid crystal layer) than the top portion of the pedestal film. The second spacer may be formed by layering another layer on the pedestal film, for example.

The plurality of pedestal films preferably protrude further toward the liquid crystal layer than a planar face provided on the second substrate. For example, the plurality of pedestal films may be a layer provided on a flattening film (on the side closer to the liquid crystal layer) that is an underlayer of the alignment film, or may be a layer provided on the alignment film (on the side closer to the liquid crystal layer). In addition, the pedestal film preferably includes a flat upper face on the side closer to the liquid crystal layer.

The plurality of pedestal films include the first pedestal film having a smaller area than the second spacer. Here, an area of the second spacer and an area of the first pedestal film mean the area of the second spacer and the area of the first pedestal film when a substrate surface of the second substrate is viewed in a plan view. Therefore, assuming that the second spacer has a shape in which a lower face is larger than an upper face (a surface closer to the liquid crystal layer), and the first pedestal film has a shape in which an upper face is larger than a lower face (a surface closer to the liquid crystal layer), the area of the pedestal film being smaller than the area of the second spacer means that the area of the upper face of the first pedestal film is smaller than the area of the lower face of the second spacer.

The plurality of pedestal films include the second pedestal film having the planar pattern that is longer, as a whole, than the planar pattern of the first pedestal film. As a result of the second pedestal film being provided, a greater effect of suppressing damage to the alignment film is obtained, compared with a case in which only the first pedestal film is provided. Here, the planar pattern of the second pedestal film being longer, as a whole, than the planar pattern of the first pedestal film means that the length of the longest portion of the second pedestal film is longer than the length of the longest portion of the first pedestal film when the substrate surface of the second substrate is viewed in a plan view. Further, the second pedestal film may have a discontinuous planar pattern, and more specifically, may have a planar pattern formed by a plurality of discontinuous portions provided corresponding to the single first spacer.

From a perspective of obtaining the effect of suppressing damage to the alignment film, an area of the planar pattern of the second pedestal film is preferably greater than an area of the planar pattern of the first pedestal film. In addition, with respect to the purpose of providing the sub-spacers in addition to the main spacers, the area of the planar pattern of the second pedestal film is preferably equal to or less than an area of the planar pattern of the second spacer.

The planar pattern of the second pedestal film is preferably set such that the top portion of the first spacer is always in contact with the second pedestal film regardless of an assumed deflection amount of the liquid crystal panel when pressure is applied to the liquid crystal panel. Further, a number and distribution of the second pedestal films may be set as appropriate, while taking into account an aperture ratio of the liquid crystal display device and the effect of suppressing the damage to the alignment film.

The first pedestal film and the second pedestal film are preferably provided in the light blocking region. For example, the first pedestal film and the second pedestal film preferably overlap with the signal line provided on the first substrate or the second substrate, or the black matrix provided on the first substrate or the second substrate.

The first pedestal film and the second pedestal film are preferably cured products formed of a photosensitive resin. When the first pedestal film and the second pedestal film are formed of the photosensitive resin, shapes of the first pedestal film and the second pedestal film can be patterned by photolithography.

In the liquid crystal display device according to the above-described embodiment, the pedestal film having a height lower than the second spacer configuring the main spacer is provided so that the first spacer does not damage the alignment film provided on the second substrate facing the first spacer. Since the pedestal film is lower than the height of the second spacer, a number and an area of the pedestal films to be arranged can be appropriately adjusted from the perspective of preventing the damage to the alignment film, while suppressing an impact on the suppression of the air bubbles and the gravitational unevenness.

A preferred form of the liquid crystal display device according to the above-described embodiment will be described below.

An arrangement density of the plurality of pedestal films is preferably greater than an arrangement density of the plurality of second spacers. In a liquid crystal display device provided with the main spacers and the sub-spacers, a number of the sub-spacers is preferably increased from the perspective of increasing the aperture ratio.

The first substrate is preferably an active matrix substrate that includes a plurality of signal lines arranged so as to intersect each other in the substrate plane, and the plurality of pedestal films are preferably arranged in regions overlapping with portions where the plurality of signal lines intersect. As a result, the area of the pedestal film can be secured while preventing the pedestal film from reducing the aperture ratio. Here, the second pedestal film preferably has a cross shape along the portion where the plurality of signal lines intersect.

Figure 2:
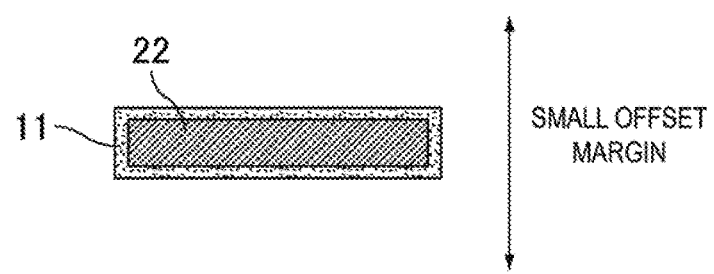
FIG. 2 is a schematic plan view illustrating an example of a configuration of a sub-spacer provided in the liquid crystal display device according to the first embodiment.
Figure 3:
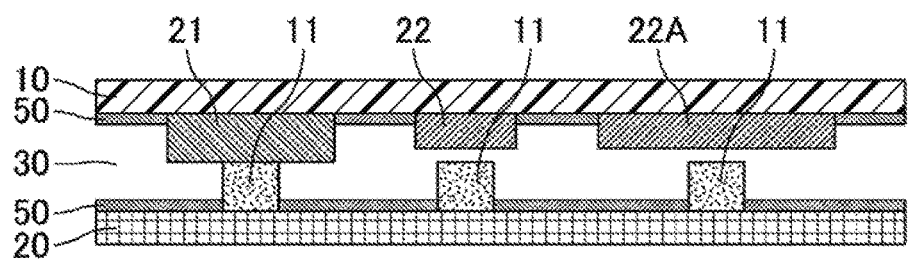
FIG. 3 is a schematic cross-sectional view illustrating an example of a configuration of a first spacer, a second spacer, and a pedestal film provided in the liquid crystal display device according to the first embodiment.

Next, the first spacer, the second spacer, and the pedestal film, and the main spacer and the sub-spacer that are both formed by a combination of the first spacer, the second spacer, and the pedestal film of the present embodiment will be described with reference to FIG. 1 to FIG. 3. FIG. 1 is a schematic plan view illustrating an example of a configuration of the main spacer provided in the liquid crystal display device according to the first embodiment. FIG. 2 is a schematic plan view illustrating an example of a configuration of the sub-spacer provided in the liquid crystal display device according to the first embodiment. FIG. 3 is a schematic cross-sectional view illustrating an example of a configuration of the first spacer, the second spacer, and the pedestal film provided in the liquid crystal display device according to the first embodiment. In FIG. 3, a case is illustrated in which a second spacer 21, a first pedestal film 22, and a second pedestal film 22A are formed on a color filter substrate (a second substrate) 10, and first spacers 11 are formed on a TFT substrate (a first substrate) 20.

As illustrated in FIG. 1 and FIG. 3, the main spacer having a cross shape, in which the first spacer 11 and the second spacer 21 that are orthogonal to each other in a plan view are layered together, is suitably used. In the main spacer having such a configuration the first spacer 11 can be received by the second spacer 21 even when the deflection of the liquid crystal panel becomes large, and as a result, the damage to the alignment film can be prevented. Thus, the main spacer having this configuration is suitable for securing a large margin (offset margin) for the deflection of the liquid crystal panel. In addition, in some cases, the black matrix is made thicker to secure the large light blocking region in order to arrange the main spacer, but if the main spacer has the above-described configuration, the main spacer is easily arranged in the region overlapping with the portion where the plurality of signal lines intersect. Thus, the reduction in the aperture ratio of the liquid crystal panel can also be suppressed.

As described above, the main spacer has the function of securing the large margin for the deflection of the liquid crystal panel. However, since, besides the retention of the cell gap, the main spacer has various roles such as the suppression of the air bubbles generated from including too little liquid crystal material and the suppression of the gravitational unevenness generated from including too much liquid crystal material, there are many restrictions on the conditions, such as the arrangement density, the size and the like with respect to the main spacer. From a perspective of securing the aperture ratio of the liquid crystal display device, the main spacers are arranged with a large interval provided therebetween, so it is difficult to prevent the damage to the alignment film using only the main spacers.

It is preferable to provide more of the sub-spacers than the main spacers in order to secure the strength of the liquid crystal panel, and the sub-spacers are preferably arranged in the light blocking region that is smaller than the main spacer in order to suppress the reduction in the aperture ratio of the liquid crystal panel. As the sub-spacers, the sub-spacer configured by a combination of the first spacer 11 and the first pedestal film 22, and the sub-spacer configured by a combination of the first spacer 11 and the second pedestal film 22A are provided. The sub-spacer illustrated in FIG. 2 is configured by the combination of the first spacer 11 and the first pedestal film 22. The sub-spacer using the first pedestal film 22 is preferably shaped so as to be able to be arranged in the narrow light blocking region, and as in the case of the sub-spacer illustrated in FIG. 2, may have a linear shape in which the first spacer 11 and the first pedestal film 22, which are parallel to each other in a plan view, overlap with each other. The sub-spacer having such a configuration has a small margin (offset margin) for the deflection of the liquid crystal panel, so when the deflection of the liquid crystal panel increases, the second spacer 22 cannot receive the first spacer 11, and as a result, there is a risk that the damage to the alignment film may not be able to be prevented.

In the liquid crystal display device according to the present embodiment, as illustrated in FIG. 3, as some of the sub-spacers, the sub-spacer using the second pedestal film 22A, which has a planar pattern that is longer than a planar pattern of the first pedestal film 22 as a whole, is used in order to improve the offset margin. Further, by configuring only some of the sub-spacers to be the sub-spacers using the second pedestal films 22A, the reduction in the aperture ratio is minimized. The sub-spacer using the second pedestal film 22A preferably has a shape similar to that of the main spacer, and the sub-spacer having a cross shape, in which the first spacer 11 and the second pedestal film 22A, which are orthogonal to each other in a plan view, are arranged to face each other, is suitably used.

Second Embodiment

A liquid crystal display device according to a second embodiment includes a first substrate, a second substrate, and a liquid crystal layer held between the first substrate and the second substrate. The first substrate includes a plurality of first spacers protruding toward the liquid crystal layer, and a first pedestal film. The second substrate includes, on a surface closer to the liquid crystal layer, an alignment film, a plurality of second spacers in contact with the plurality of first spacers, and a second pedestal film. The first pedestal film is lower and smaller in area than each of the plurality of first spacers, and faces the plurality of second spacers. The second pedestal film is lower than each of the plurality of second spacers, faces the plurality of first spacers, and has a planar pattern that is longer, as a whole, than a planar pattern of the first pedestal film. The liquid crystal display device according to the second embodiment will be described below, but descriptions of common matters with the liquid crystal display device according to the first embodiment will be omitted.

Figure 4:
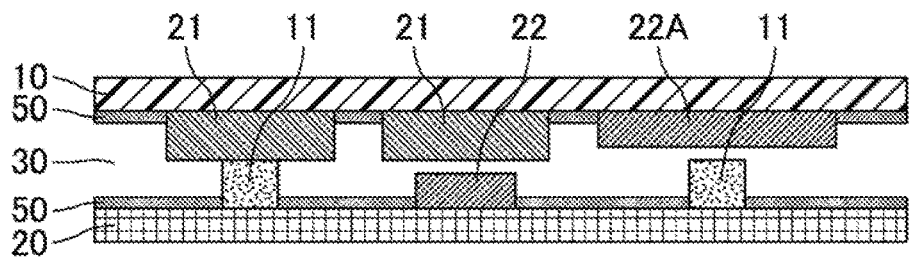
FIG. 4 is a schematic cross-sectional view illustrating an example of a configuration of the first spacer, the second spacer, and the pedestal film provided in a liquid crystal display device according to a second embodiment.

FIG. 4 is a schematic cross-sectional view illustrating an example of a configuration of the first spacers, the second spacers, and the pedestal films provided in the liquid crystal display device according to the second embodiment. The liquid crystal display device according to the second embodiment differs from the liquid crystal display device according to the first embodiment in that the first pedestal film 22 and the second pedestal film 22A are formed on the different substrates. The sub-spacers in the second embodiment are configured by a combination of the first spacer 11 and the second pedestal film 22A, and a combination of the second spacer 21 and the first pedestal film 22.

The disclosure will be described in more detail below using examples, but the disclosure is not limited to these examples alone.

Example 1

Figure 5:
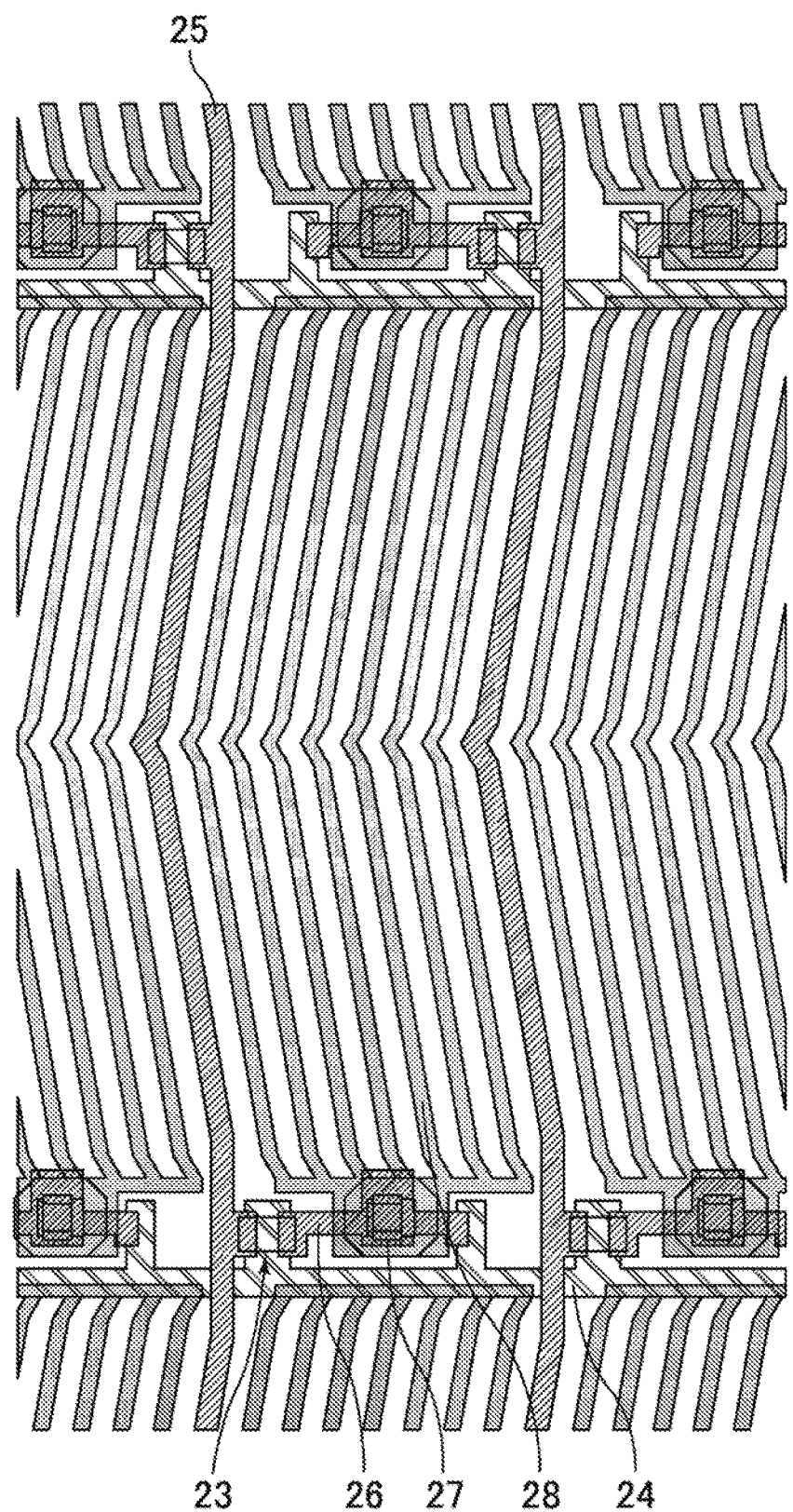
FIG. 5 is a schematic plan view illustrating a configuration of a pixel in a TFT substrate provided in the liquid crystal display device of Example 1.
Figure 6:
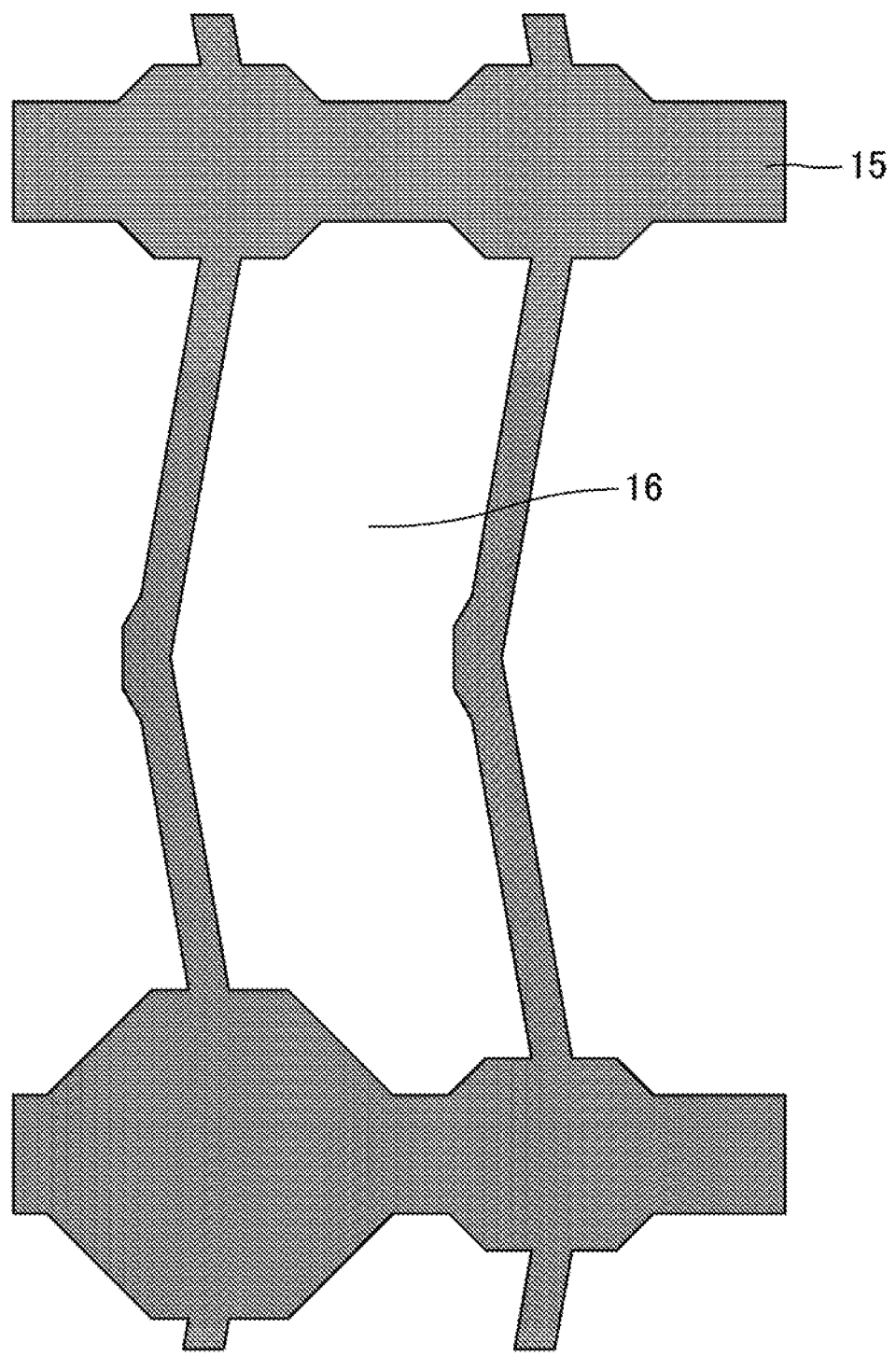
FIG. 6 is a schematic plan view illustrating a configuration of the pixel in a color filter substrate provided in the liquid crystal display device of Example 1.
Figure 7:
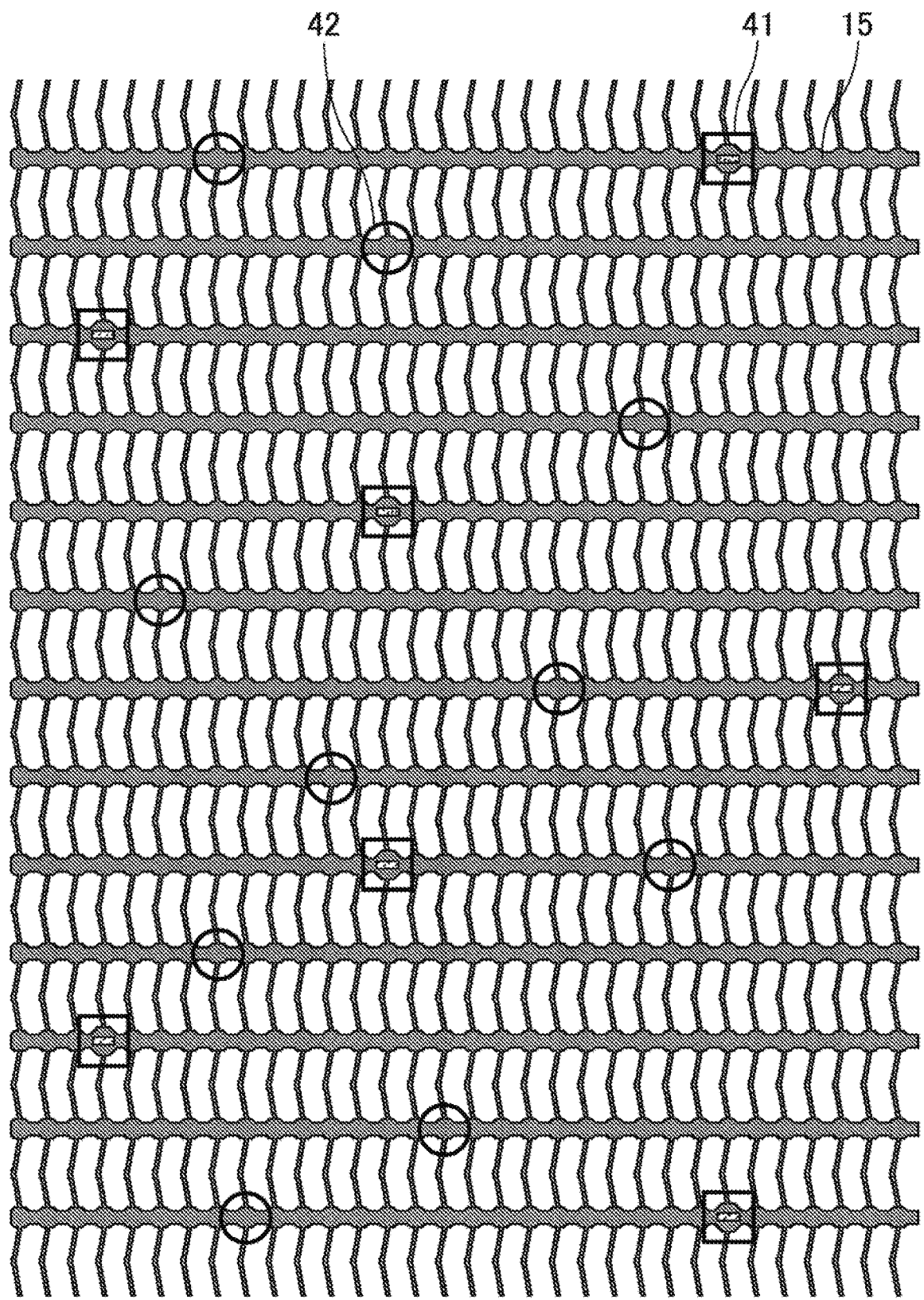
FIG. 7 is a schematic plan view illustrating an arrangement of the main spacers and the sub-spacers in the liquid crystal display device of Example 1.
Figure 8:
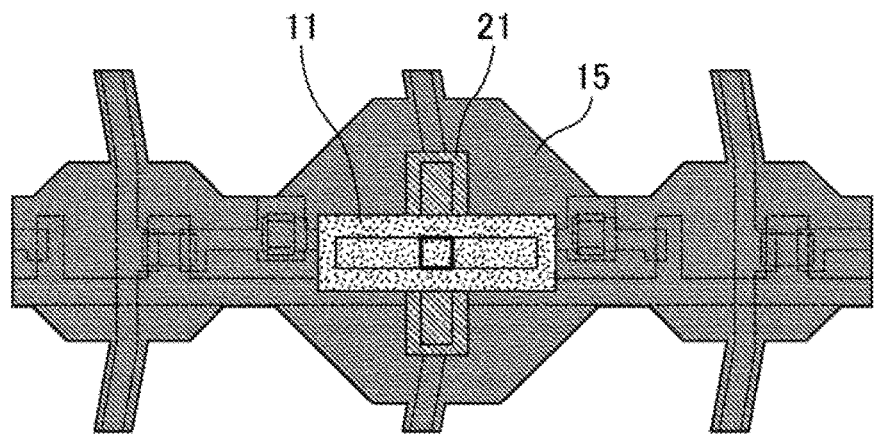
FIG. 8 is an enlarged schematic plan view illustrating an arrangement location of the main spacer.
Figure 9:
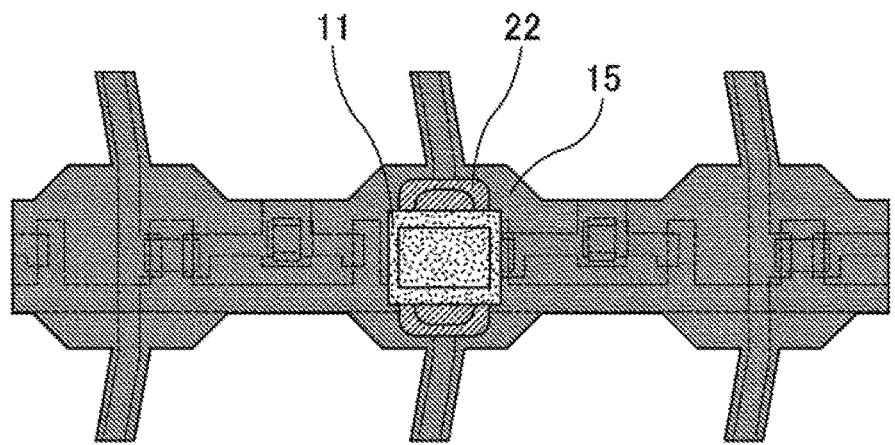
FIG. 9 is an enlarged schematic plan view illustrating an arrangement location of the sub-spacer using a first pedestal film.
Figure 10:
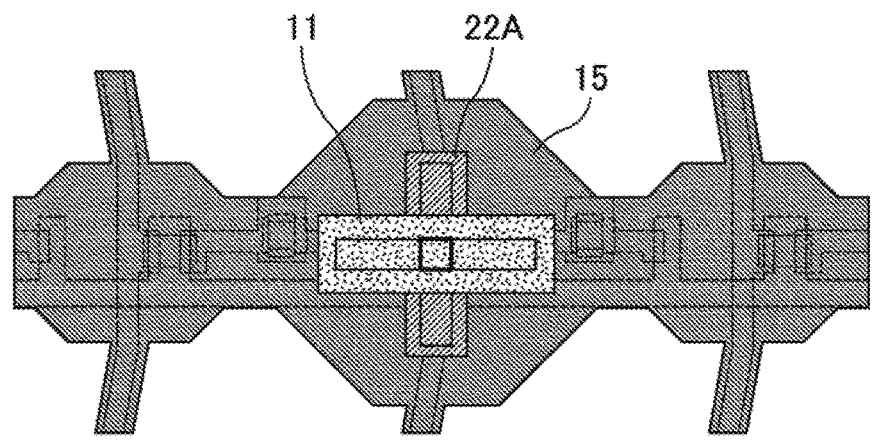
FIG. 10 is an enlarged schematic plan view illustrating an arrangement location of the sub-spacer using a second pedestal film.

FIG. 5 is a schematic plan view illustrating a configuration of a pixel in a TFT substrate provided in the liquid crystal display device of Example 1. FIG. 6 is a schematic plan view illustrating a configuration of the pixel in a color filter substrate provided in the liquid crystal display device of Example 1. FIG. 7 is a schematic plan view illustrating an arrangement of the main spacers and the sub-spacers in the liquid crystal display device of Example 1. FIG. 8 is an enlarged schematic plan view illustrating an arrangement location of the main spacer. FIG. 9 is an enlarged schematic plan view illustrating an arrangement location of the sub-spacer using the first pedestal film. FIG. 10 is an enlarged schematic plan view illustrating an arrangement location of the sub-spacer using the second pedestal film. Next, a configuration of the liquid crystal display device of Example 1 will be described with reference to FIG. 5 to FIG. 10. In Example 1, a case is illustrated in which the second spacer 21, the first pedestal film 22, and the second pedestal film 22A are formed on the TFT substrate (the second substrate) 20, and the first spacer 11 is formed on the color filter substrate (the first substrate) 10.

The liquid crystal display device of Example 1 employs a fringe field switching (FFS)-type liquid crystal mode. The TFT substrate 20 includes a thin film transistor (TFT) 23 in a corner portion of a pixel, where a gate signal line 24 and a source signal line 25 intersect each other. A pixel electrode 28 including a plurality of comb teeth portion is electrically connected to a drain electrode 26 of the TFT 23 in a contact hole 27. The contact hole 27 is a conductive portion penetrating a flattening film, which separates a lower layer conductive portion, such as the drain electrode 26, from the pixel electrode 28. The flattening film is formed of an insulating resin and includes a planar face on a side closer to the liquid crystal layer 30. The second spacer 21, the first pedestal film 22, and the second pedestal portion 22A are provided on the flattening film (on the side closer to the liquid crystal layer) in the corner portions of some of the pixels.

On the color filter substrate 10, a black matrix (BM) 15 is arranged in a region facing the TFT 23, the gate signal line 24, and the source signal line 25 of the TFT substrate 20. A color filter 16 is arranged within a region partitioned by the BM 15 (within the pixel). A color of the color filter 16 is different from pixel to pixel, and a combination of colors such as red (R), green (G), and blue (B) is provided. The first spacers 11 are provided in the corner portions of some of the pixels.

As illustrated in FIG. 7, more arrangement locations 42 of the sub-spacers are provided than arrangement locations 41 of the main spacers. The light blocking region formed by the BM 15 at the arrangement location 41 of the main spacer is larger than the light blocking region formed by the BM 15 at the arrangement location 42 of the sub-spacer.

As illustrated in FIG. 8, at the arrangement location 41 of the main spacer, the first spacer 11 and the second spacer 21 that are orthogonal to each other in a plan view are provided. In the normal state in which no pressure is applied to the liquid crystal panel, a top portion of the first spacer 11 and a top portion of the second spacer 21 are in contact with each other, and thus, the distance (cell thickness) between the pair of substrates is defined. The first spacer 11 and the second spacer 21 are cured products (photo spacers) formed of a photosensitive resin, and formed by photolithography. The first spacer 11 and the second spacer 21 each have a substantially trapezoidal cross-sectional shape having a bottom portion larger than a top portion.

As illustrated in FIG. 9, of the arrangement locations 42 of the sub-spacers, at the arrangement location of the sub-spacer using the first pedestal film 22, the first spacer 11 and the first pedestal film 22, which are parallel to each other in a plan view, are provided. In the normal state in which there is no pressure applied to liquid crystal panel, the top portion of the first spacer 11 and the top portion of the first pedestal film 22 are not in contact with each other, but in the state in which the pressure is applied to the liquid crystal panel, by the top portion of the first spacer 11 coming into contact with the top portion of the first pedestal film 22, a function of preventing an excessive deformation of the liquid crystal panel is obtained. The first spacer 11 and the first pedestal film 22 are cured products (photo spacers) formed of a photosensitive resin, and formed by photolithography. The first spacer 11 and the first pedestal film 22 each have a substantially trapezoidal cross-sectional shape with a bottom portion larger than a top portion thereof. Note that the first spacer 11 that configures the sub-spacer using the first pedestal film 22 may be the same as or different from the first spacer 11 that configures the main spacer in terms of the shape and the height. The first pedestal film 22 has a smaller area than the second spacer 21, and has a planar pattern having a length equal to or less than the planar pattern of the second spacer 21.

As illustrated in FIG. 10, of the arrangement locations 42 of the sub-spacers, at the arrangement location 42 of the sub-spacer using the second pedestal film 22A, the first spacer 11 and the second pedestal film 22A, which are orthogonal to each other in a plan view, are provided in the same manner as at the arrangement location 41 of the main spacer. In the normal state in which no pressure is applied to the liquid crystal panel, the top portion of the first spacer 11 and a top portion of the second pedestal film 22A are not in contact with each other, but in the state in which the pressure is applied to the liquid crystal panel, by the top portion of the first spacer 11 coming into contact with the top portion of the second pedestal film 22A, a function of preventing an excessive deformation of the liquid crystal panel is obtained in the same manner as at the arrangement location 42 of the sub-spacer using the first pedestal film 22. The first spacer 11 and the second pedestal film 22A are cured products (photo spacers) formed of a photosensitive resin, and formed by photolithography. The first spacer 11 and the second pedestal film 22A each have a substantially trapezoidal cross-sectional shape having a bottom portion larger than a top portion. Note that the first spacer 11 that configures the sub-spacer using the second pedestal film 22A may be the same as or different from the first spacer 11 that configures the main spacer, or the first spacer 11 that configures the sub-spacer using the first pedestal film 22, in terms of the shape and the height. The second pedestal film 22A has a larger area than the first pedestal film 22, and has the planar pattern longer than the planar pattern of the first pedestal film 22. Thus, the light blocking region formed by the BM 15 at the arrangement location of the sub-spacer using the second pedestal film 22A is larger than the light blocking region formed by the BM 15 at the arrangement location of the sub-spacer using the first pedestal film 22. Further, the second pedestal film 22A may have the same planar pattern as the planar pattern of the second spacer 21, or may have a different planar pattern from the planar pattern of the second spacer 21.

The dimensions of each portion in Example 1 are designed, for example, as follows:

First Example

Liquid crystal cell thickness: 3.4 μm
Height of first spacer: 2.2 μm
Height of second spacer: 1.4 μm
Height of first pedestal film: 0.9 μm
Height of second pedestal film: 0.9 μm Second Example Liquid crystal cell thickness: 3.0 μm
Height of first spacer: 1.7 μm
Height of second spacer: 1.5 μm
Height of first pedestal film: 1.0 μm
Height of second pedestal film: 1.0 μm The height of the second pedestal film 22A is preferably set to be equal to or greater than an assumed amount of deformation caused by a load applied to the second pedestal film 22A when pressure is applied to the liquid crystal panel, so that the damage to the alignment film can be suppressed when the pressure is applied to the liquid crystal panel and the liquid crystal panel is deflected. In other words, the height of the second pedestal film 22A is preferably designed so that when the second pedestal film 22A is deformed, an end portion of the second pedestal film 22A does not come into contact with the alignment film. The amount of deformation of the second pedestal film 22A depends on the elastic modulus of the material, but the second pedestal film 22A preferably has a height of 0.2 μm or greater, and more preferably has a height of 0.3 μm or greater. In addition, the second pedestal film 22A preferably has a height equal to or less than the height of the first spacer 11 in order not to affect the cell thickness, and more preferably has a height equal to or less than the height of the first pedestal film 22.

Figure 11A:
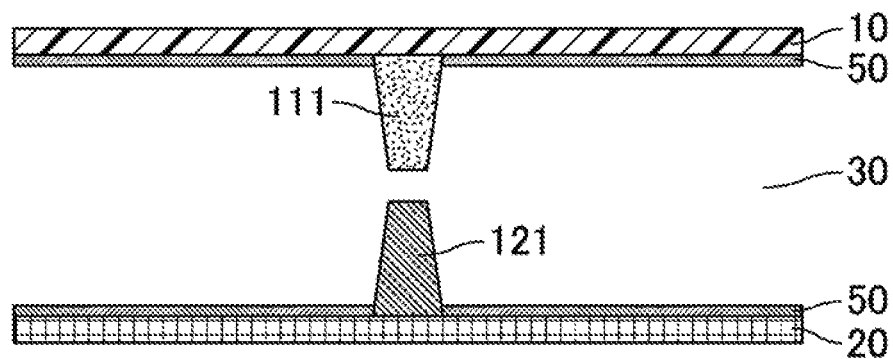
FIG. 11A is a cross-sectional view illustrating a configuration of a liquid crystal panel having a known configuration.
Figure 11B:
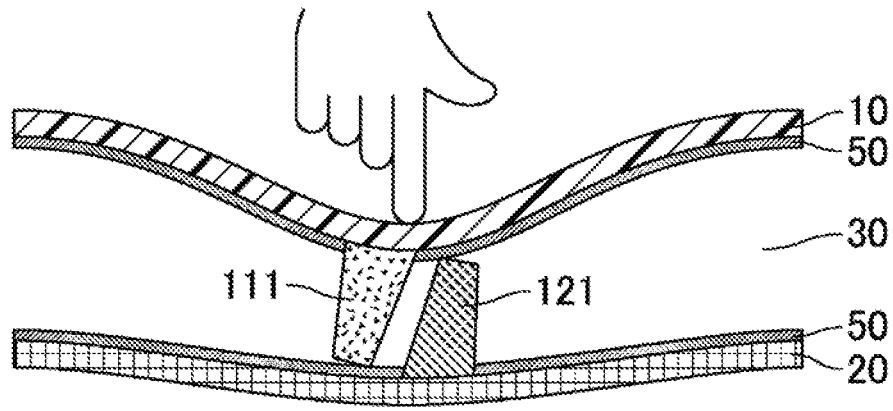
FIG. 11B is a cross-sectional view illustrating a state in which pressure is applied to the liquid crystal panel illustrated in FIG. 11A and the liquid crystal panel is deflected.
Figure 12A:
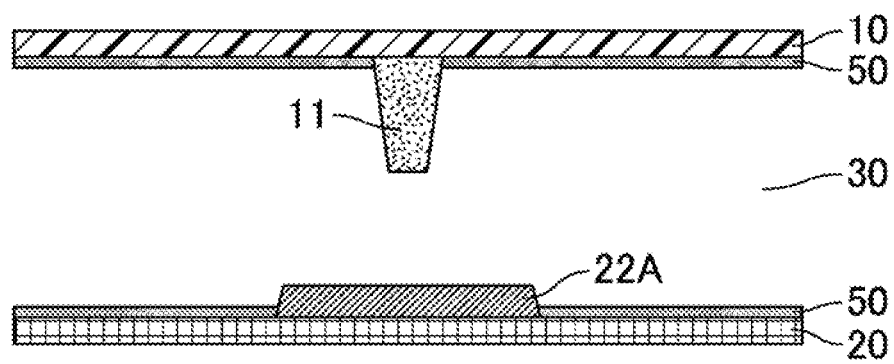
FIG. 12A is a cross-sectional view illustrating a configuration of the liquid crystal panel having the configuration of Example 1.
Figure 12B:
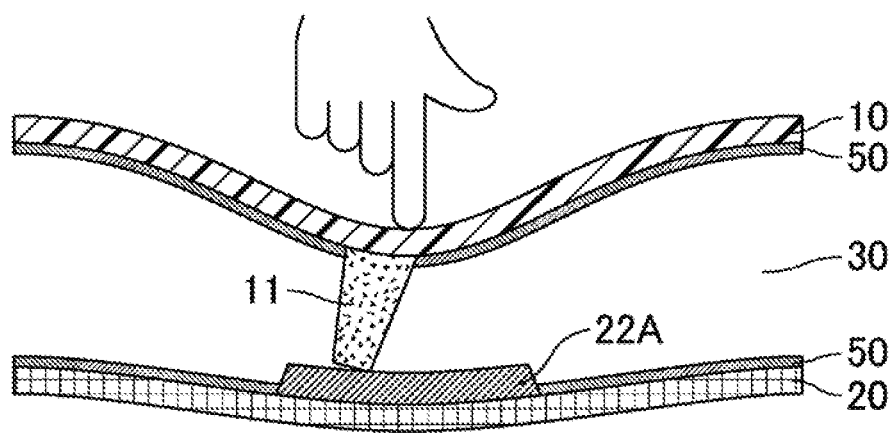
FIG. 12B is a cross-sectional view illustrating a state in which pressure is applied to the liquid crystal panel illustrated in FIG. 12A and the liquid crystal panel is deflected.

As described above, in Example 1, since the sub-spacers using the second pedestal films 22A are provided, the damage to the alignment film can be effectively prevented when the pressure is applied to the liquid crystal panel and the liquid crystal panel is deflected. The reasons for this will be described with reference to the drawings. FIG. 11A is a cross-sectional view illustrating a configuration of a liquid crystal panel having a known configuration. FIG. 11B is a cross-sectional view illustrating a state when pressure is applied to the liquid crystal panel illustrated in FIG. 11A and the liquid crystal panel is deflected. FIG. 12A is a cross-sectional view illustrating a configuration of the liquid crystal panel having the configuration of Example 1. FIG. 12B is a cross-sectional view illustrating a state when pressure is applied to the liquid crystal panel illustrated in FIG. 12A and the liquid crystal panel is deflected.

As illustrated in FIG. 11B, when pressure is applied to the liquid crystal panel having the known configuration by a finger or the like and the liquid crystal panel is deflected, a spacer 111 provided on the color filter substrate 10 and a spacer 121 provided on the TFT substrate 20 move in accordance with the deflection of the liquid crystal panel, and thus may not be able to come into contact with each other. In this case, the spacer 111 provided on the color filter substrate 10 damages an alignment film 50 formed on the TFT substrate 20, and the spacer 121 provided on the TFT substrate 20 damages the alignment film 50 formed on the color filter substrate 10.

On the other hand, as illustrated in FIG. 12B, when pressure is applied to the liquid crystal panel having the configuration of Example 1 by a finger or the like and the liquid crystal panel is deflected, even when the first spacer 11 provided on the color filter substrate 10 moves in accordance with the deflection of the liquid crystal panel, the first spacer 11 can come into contact with the second pedestal film 22A provided on the TFT substrate 20, and damage to the alignment film 50 is prevented. This is because the second pedestal film 22A has the planar pattern that is longer, as a whole, than the planar pattern of the first pedestal film 22.

Figure 13A:
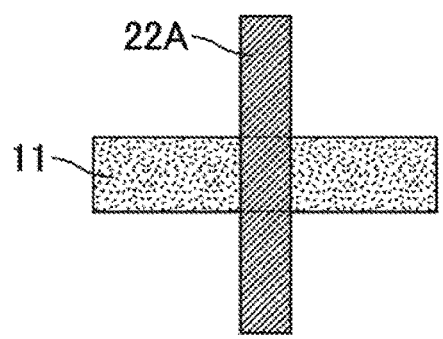
FIG. 13A is a schematic plan view illustrating an example of a planar shape of the sub-spacer using the second pedestal film.
Figure 13B:
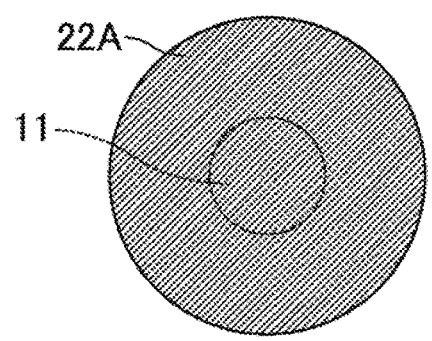
FIG. 13B is a schematic plan view illustrating an example of the planar shape of the sub-spacer using the second pedestal film.
Figure 13C:
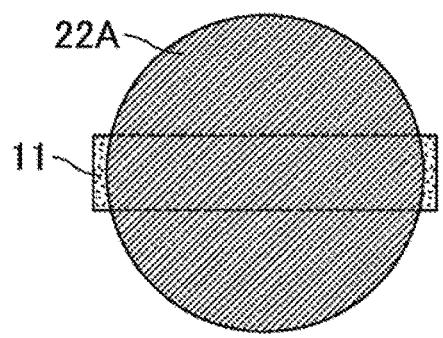
FIG. 13C is a schematic plan view illustrating an example of the planar shape of the sub-spacer using the second pedestal film.
Figure 13D:
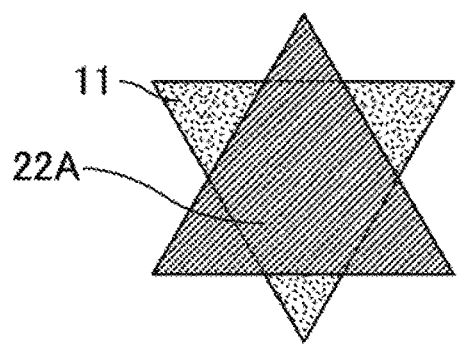
FIG. 13D is a schematic plan view illustrating an example of the planar shape of the sub-spacer using the second pedestal film.
Figure 13E:
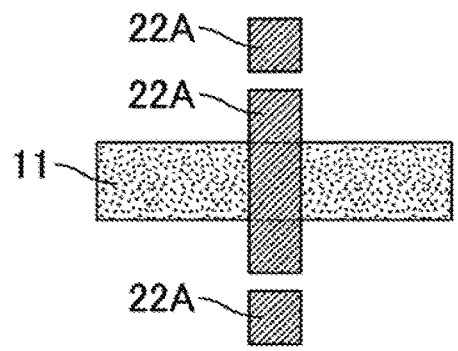
FIG. 13E is a schematic plan view illustrating an example of the planar shape of the sub-spacer using the second pedestal film.
Figure 13F:
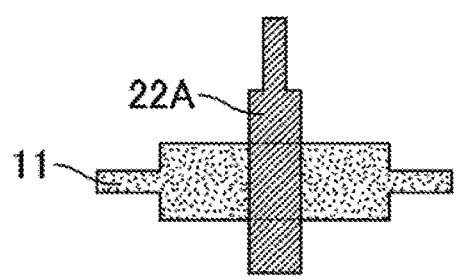
FIG. 13F is a schematic plan view illustrating an example of the planar shape of the sub-spacer using the second pedestal film.

Note that the planar shape of the sub-spacer using the second pedestal film 22A is not limited to the cross shape illustrated in FIG. 10, but may be, for example, a shape illustrated in FIG. 13A, 13B, 13C, 13D, 13E, or 13F. As illustrated in FIG. 13E, the second pedestal film 22A may have a planar pattern configured by a plurality of discontinuous portions provided corresponding to the single first spacer 11.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a first substrate;
a second substrate; and
a liquid crystal layer held between the first substrate and the second substrate,
wherein the first substrate includes a plurality of first spacers protruding toward the liquid crystal layer,
the second substrate includes, on a surface closer to the liquid crystal layer, an alignment film, a plurality of second spacers in contact with the plurality of first spacers, and a plurality of pedestal films facing the plurality of first spacers,
a height of the plurality of second spacers is greater than a height of the plurality of pedestal films, and
the plurality of pedestal films include a first pedestal film having a smaller area than an area of each of the plurality of second spacers, and a second pedestal film having a planar pattern that is longer, as a whole, than a planar pattern of the first pedestal film.

2. The liquid crystal display device according to claim 1, wherein an arrangement density of the plurality of pedestal films is greater than an arrangement density of the plurality of second spacers.

3. The liquid crystal display device according to claim 1, wherein the first substrate is an active matrix substrate including a plurality of signal lines arranged to intersect each other in a substrate plane, and
the plurality of pedestal films are arranged in a region overlapping with a portion where the plurality of signal lines intersect.

4. The liquid crystal display device according to claim 3, wherein the second pedestal film has a cross shape along the portion where the plurality of signal lines intersect.

* * * * *